US009457439B2

(12) United States Patent
Imi

(10) Patent No.: US 9,457,439 B2
(45) Date of Patent: Oct. 4, 2016

(54) FASTENING AND LOOSENING DEVICE

(75) Inventor: Katsumi Imi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 611 days.

(21) Appl. No.: 13/878,717

(22) PCT Filed: Jan. 26, 2012

(86) PCT No.: PCT/JP2012/051689
§ 371 (c)(1),
(2), (4) Date: Apr. 10, 2013

(87) PCT Pub. No.: WO2012/105412
PCT Pub. Date: Aug. 9, 2012

(65) Prior Publication Data
US 2013/0185932 A1    Jul. 25, 2013

(30) Foreign Application Priority Data
Feb. 1, 2011   (JP) .................................. 2011-020157

(51) Int. Cl.
*G21C 19/20*    (2006.01)
*B23P 19/06*    (2006.01)
*B25B 29/02*    (2006.01)
(Continued)

(52) U.S. Cl.
CPC .............. *B23P 19/067* (2013.01); *B25B 29/02* (2013.01); *G21C 13/073* (2013.01); *G21C 19/02* (2013.01); *G21C 19/20* (2013.01); *Y02E 30/40* (2013.01); *Y10T 29/53087* (2015.01)

(58) Field of Classification Search
CPC .. G21C 13/073; G21C 19/20; G21C 19/207; B23P 19/06; B23P 19/067; B25B 29/02; Y10T 29/53087; Y10T 29/531
See application file for complete search history.

(56) References Cited

U.S. PATENT DOCUMENTS 3,851,906 A * 12/1974 Frisch ................... B23P 19/067
                                                                220/327
4,047,456 A *  9/1977 Scholz .................... B25B 29/02
                                                                376/260
(Continued)

FOREIGN PATENT DOCUMENTS

JP      60-047072 B2    10/1985
JP      60-238793 A     11/1985
(Continued)

OTHER PUBLICATIONS

Decision to Grant a Patent dated Jun. 9, 2015, issued in counterpart Japanese Patent Application No. 2011-020157, w/English translation (4 pages).
(Continued)

*Primary Examiner* — Christopher M Koehler
(74) *Attorney, Agent, or Firm* — Westerman, Hattori, Daniels & Adrian, LLP

(57) ABSTRACT

A fastening and loosening device includes transport devices capable of moving along the array direction of a plurality of stud bolts, control panels that independently control the transport devices, a plurality of bolt tensioners, control panels that independently control the bolt tensioners, and a transport operating device having a control panel that controls the control panels and the control panels, and a fault diagnosis device is provided by connecting the control panels to the transport operation device through power cables, whereby the reliability of the device can be improved.

4 Claims, 14 Drawing Sheets

(51) Int. Cl.
*G21C 19/02* (2006.01)
*G21C 13/073* (2006.01)

(56) References Cited

U.S. PATENT DOCUMENTS

| | | | | |
|---|---|---|---|---|
| 4,223,575 A * | 9/1980 | Krueger | ............ | B23P 19/06 29/723 |
| 4,548,103 A * | 10/1985 | Orban | ............ | B25B 21/002 376/260 |
| 4,552,038 A * | 11/1985 | Heiermann | ............ | B23P 19/06 254/29 A |
| 4,675,967 A * | 6/1987 | Okada | ............ | B23P 19/06 29/240 |
| 4,873,760 A * | 10/1989 | Watanabe | ............ | B23P 19/06 29/240 |
| 4,883,185 A * | 11/1989 | Fujitani | ............ | B23P 19/001 212/273 |
| 5,101,694 A * | 4/1992 | Sevelinge | ............ | B23P 19/06 81/57.24 |
| 5,249,208 A * | 9/1993 | Ruzga | ............ | B23P 19/067 376/260 |
| 5,703,916 A * | 12/1997 | Wilhelm | ............ | B23P 19/067 29/DIG. 46 |
| 5,730,421 A * | 3/1998 | Wilhelm | ............ | B23P 19/067 254/29 A |

FOREIGN PATENT DOCUMENTS

| | | |
|---|---|---|
| JP | 60-057996 B2 | 12/1985 |
| JP | 5-214451 A | 8/1993 |
| JP | 8-279692 A | 10/1996 |
| JP | 10-280488 A | 10/1998 |
| JP | 2000-246560 A | 9/2000 |
| JP | 2001-027992 A | 1/2001 |
| JP | 2004-334548 A | 11/2004 |
| JP | 2005-131723 A | 5/2005 |

OTHER PUBLICATIONS

International Search Report for PCT/JP2012/051689, mailing date of Mar. 19, 20112.
Written Opinion of PCT/JP2012/051689, mailing date of Mar. 19, 2012.
English Translation of Written Opinion dated Mar. 19, 2012, issued in corresponding application No. PCT/JP2012/051689.

* cited by examiner

FASTENING AND LOOSENING DEVICE

FIELD OF THE INVENTION

The present invention relates to a fastening and loosening device, for example, that fastens a nut by rotating the nut while applying tension to a stud bolt when mounting a lid on an upper portion of a reactor vessel, or loosens the nut by rotating the nut while applying tension to the stud bolt when removing the lid fixed to the upper portion of the reactor vessel.

BACKGROUND OF THE INVENTION

For example, a pressurized water reactor (PWR) is a reactor that uses light water as a nuclear reactor coolant and a neutron moderator, makes high-temperature and high-pressure water that does not boil over the entire reactor internal, sends the high-temperature and high-pressure water to a steam generator to generate steam by heat exchange, and sends the steam to a turbine generator to generate electricity.

A reactor vessel that is used in such a pressurized water reactor is configured to include a reactor vessel main body and a reactor vessel lid that is mounted on an upper portion of the reactor vessel main body such that core internals can be inserted into the inside thereof, and is made such that the reactor vessel lid can be opened and closed to the reactor vessel main body. Then, in a case of detachably mounting the reactor vessel lid on the reactor vessel main body, a nut is fastened by passing a stud bolt through an outer peripheral flange of the reactor vessel lid, screwing and implanting the stud bolt into an outer peripheral flange of an upper portion of the reactor vessel main body, and screwing the nut while applying tension to the stud bolt.

As such a fastening and loosening device, there is a device described in Japanese Patent Application Publication No. 60-047072 (Patent Literature 1). In the device described in Patent Literature 1, four stud tensioning devices are connected to a single centralized control device and the centralized control device centrally controls the four stud tensioning devices.

In a nuclear power plant, in order to continue a safe and efficient enterprise, fuel exchange and check of a nuclear reactor and periodic inspection work of other peripheral equipment are carried out. Such works are indispensable for a safe operation in an electric power plant, whereas process observance and further process shortening are required under the economic demands. Mounting and dismounting work of the reactor vessel lid to the reactor vessel main body described above is carried out by a fastening and loosening device, and if the fastening and loosening device breaks down during work, it becomes difficult to perform opening of the nuclear reactor, thereby directly leading to subsequent process delay. Therefore, the fastening and loosening device needs to be able to reliably carry out the mounting and dismounting work of the reactor vessel lid and continue to complete the work in some way even when a fault has occurred in various equipments.

In the fastening and loosening device of the related art described above, since the single centralized control device centrally controls the four stud tensioning devices, in a case where a fault occurs in either of a control panel of the centralized control device or a control panel of each stud tensioning device, an operation of the entire device is stopped. At this time, since each stud tensioning device is controlled by the centralized control device, the stud tensioning devices cannot be operated independently. Then, since each stud tensioning device is centrally controlled by the centralized control device, a unique ID for identification is given thereto and replacement work of the control panel thereof or the like becomes cumbersome. As a result, recovery work at the time of a fault of the fastening and loosening device becomes large-scale and the mounting and dismounting work of the reactor vessel lid is performed over a long period of time.

The present invention is for solving the above-described problem and has an object of providing a fastening and loosening device that enables improvement in the reliability of the device.

BRIEF SUMMARY OF THE INVENTION

According to an aspect of the present invention in order to achieve the object, there is provided a fastening and loosening device that performs fastening or loosening by screwing and arranging a plurality of stud bolts to an object to be fastened, screwing a nut onto each of the plurality of stud bolts, and rotating the nut while applying tension to the stud bolt in an axial direction away from the object to be fastened, the fastening and loosening device including: a plurality of transport devices capable of moving along an array direction of the plurality of stud bolts; a plurality of first control devices that independently controls the plurality of transport devices; a plurality of bolt tensioners that is supported on the plurality of transport devices; a plurality of second control devices that independently controls the plurality of bolt tensioners; a main control device that controls the plurality of first control devices and the plurality of second control devices; a first network that connects the main control device and the plurality of first control devices; a second network that connects the main control device and the plurality of second control devices; and a fault diagnosis device that is provided in the first network.

Therefore, the fault diagnosis device performs mutual fault diagnosis in the main control device, the plurality of first control devices, and the plurality of transport devices by the first network, and thus it is possible to allow the reliability of the device to be improved.

In the fastening and loosening device according to the aspect, it is characterized that the fault diagnosis device diagnoses faults of the main control device and the plurality of first control devices by transmitting a fault diagnosis signal from the main control device to the plurality of first control devices by the first network and also returning the fault diagnosis signal from the plurality of first control devices to the main control device.

Therefore, when the fault diagnosis signal flows through the main control device, the first network, the first control devices, the first network, and the main control device, a fault of the main control device or the first control devices can be easily diagnosed by the cutting position of the signal.

In the fastening and loosening device according to the aspect, it is characterized that the fault diagnosis device diagnoses a fault of the first network by transmitting a fault diagnosis signal from the main control device to the plurality of first control devices by the first network and also returning the fault diagnosis signal from the plurality of first control devices to the main control device.

Therefore, when the fault diagnosis signal flows through the main control device, the first network, the first control devices, the first network, and the main control device, disconnection of the first network can be easily diagnosed by the cutting position of the signal.

In the fastening and loosening device according to the aspect, it is characterized that the main control device includes a switching device capable of switching between a first control form to control the transport device through the first control device and a second control form in which the first control device is broken away from the main control device and controls the transport device.

Therefore, during the normal time of the main control device, the switching device performs switching to the first control form, whereby the main control device controls each first control device, and on the other hand, at the time of a fault of the main control device, the switching device performs switching to the second control form, whereby one of the first control devices controls the other of the first control devices, and thus the control continues to be possible.

In the fastening and loosening device according to the aspect, it is characterized that the main control device, the first control device, and the transport device are mounted on the object to be fastened, and connected by the first network permanently installed, the second control device and the bolt tensioner are detachably mounted on the object to be fastened, and the main control device, the second control device, and the bolt tensioner are connected by the second network that is detachable.

Therefore, the fault diagnosis device performs fault diagnosis to the main control device, the first control devices, and the first network which are permanently installed, whereby high reliability can be secured.

According to the fastening and loosening device related to the invention, since the fastening and loosening device includes the main control device that controls the first control devices and the second control devices, the first network that connects the main control device and the first control devices, and the fault diagnosis device that is provided in the first network, it is possible to improve the reliability of the device.

BRIEF DESCRIPTION OF DRAWINGS

FIG. 7-1 is a schematic view illustrating an operation of the bolt tensioner.

FIG. 7-2 is a schematic view illustrating an operation of the bolt tensioner.

FIG. 7-3 is a schematic view illustrating an operation of the bolt tensioner.

FIG. 7-4 is a schematic view illustrating an operation of the bolt tensioner.

FIG. 7-5 is a schematic view illustrating an operation of the bolt tensioner.

DETAILED DESCRIPTION OF THE INVENTION

Hereinafter, a preferred example of a fastening and loosening device according to the invention will be described in detail with reference to the accompanying drawings. In addition, the invention is not limited by this example, and in a case where there are plural examples, the invention also includes a configuration that is made by the combination of the respective examples.

EXAMPLE

Figure 1:
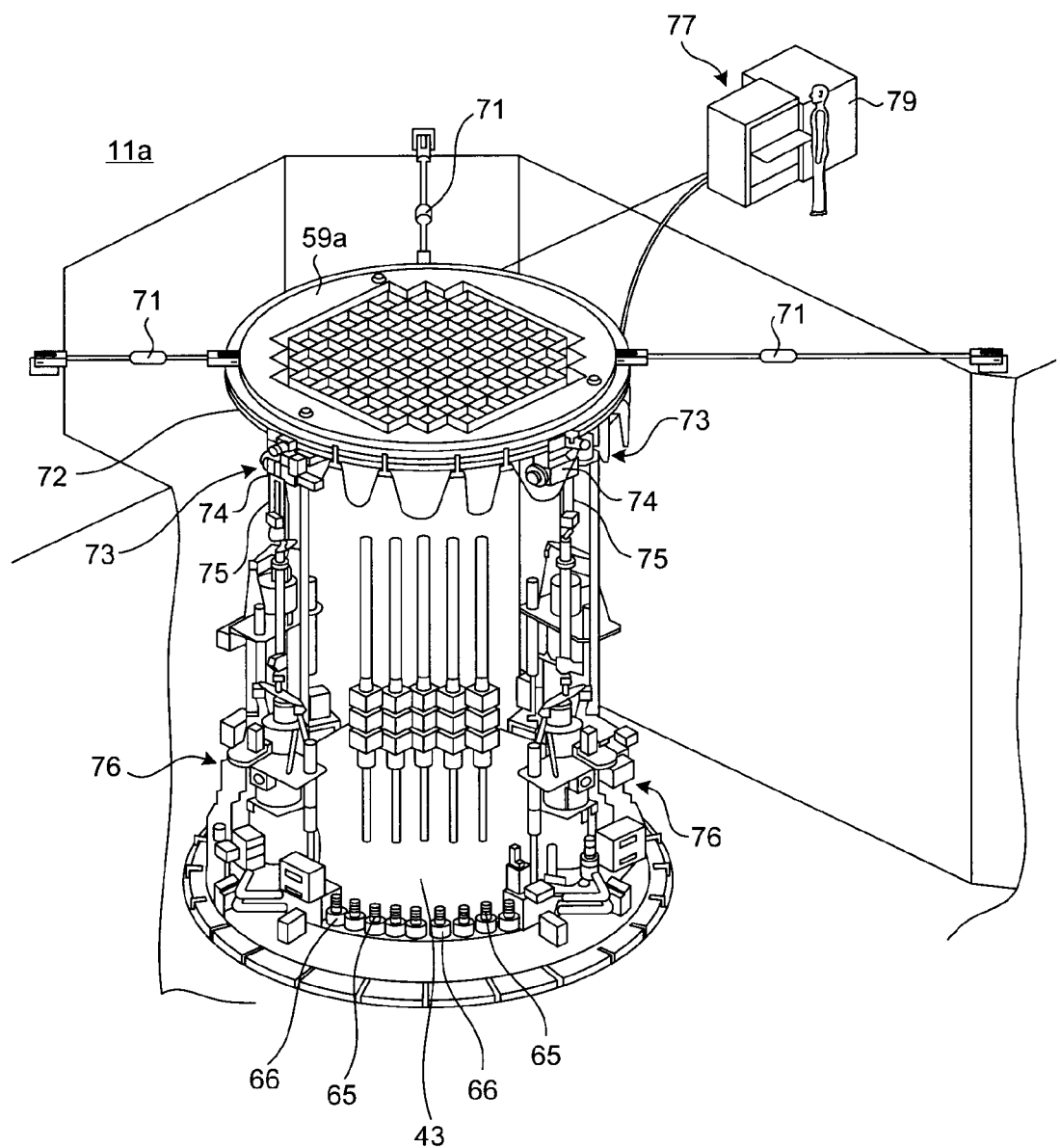
FIG. 1 is a perspective view illustrating the overall configuration of a fastening and loosening device related to an example of the invention.
Figure 2:
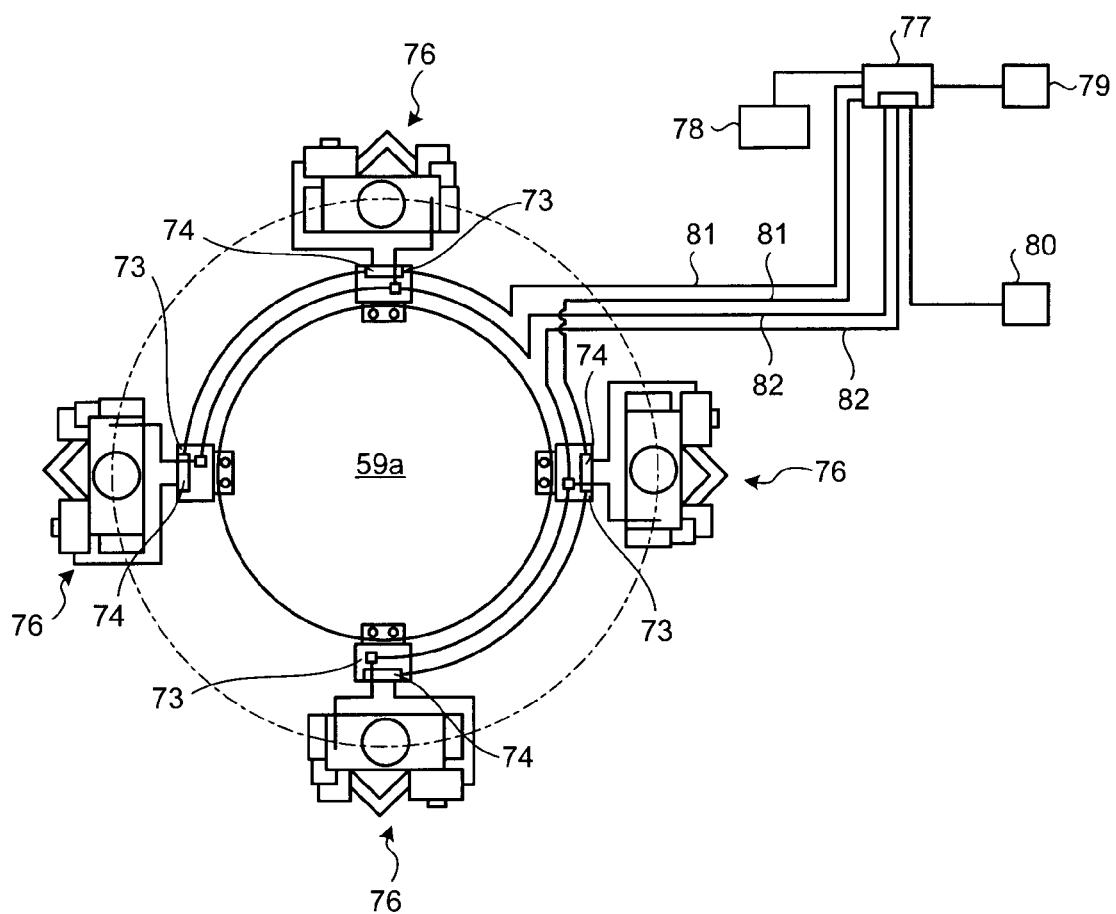
FIG. 2 is a plan view illustrating the overall configuration of the fastening and loosening device of the example.
Figure 3:
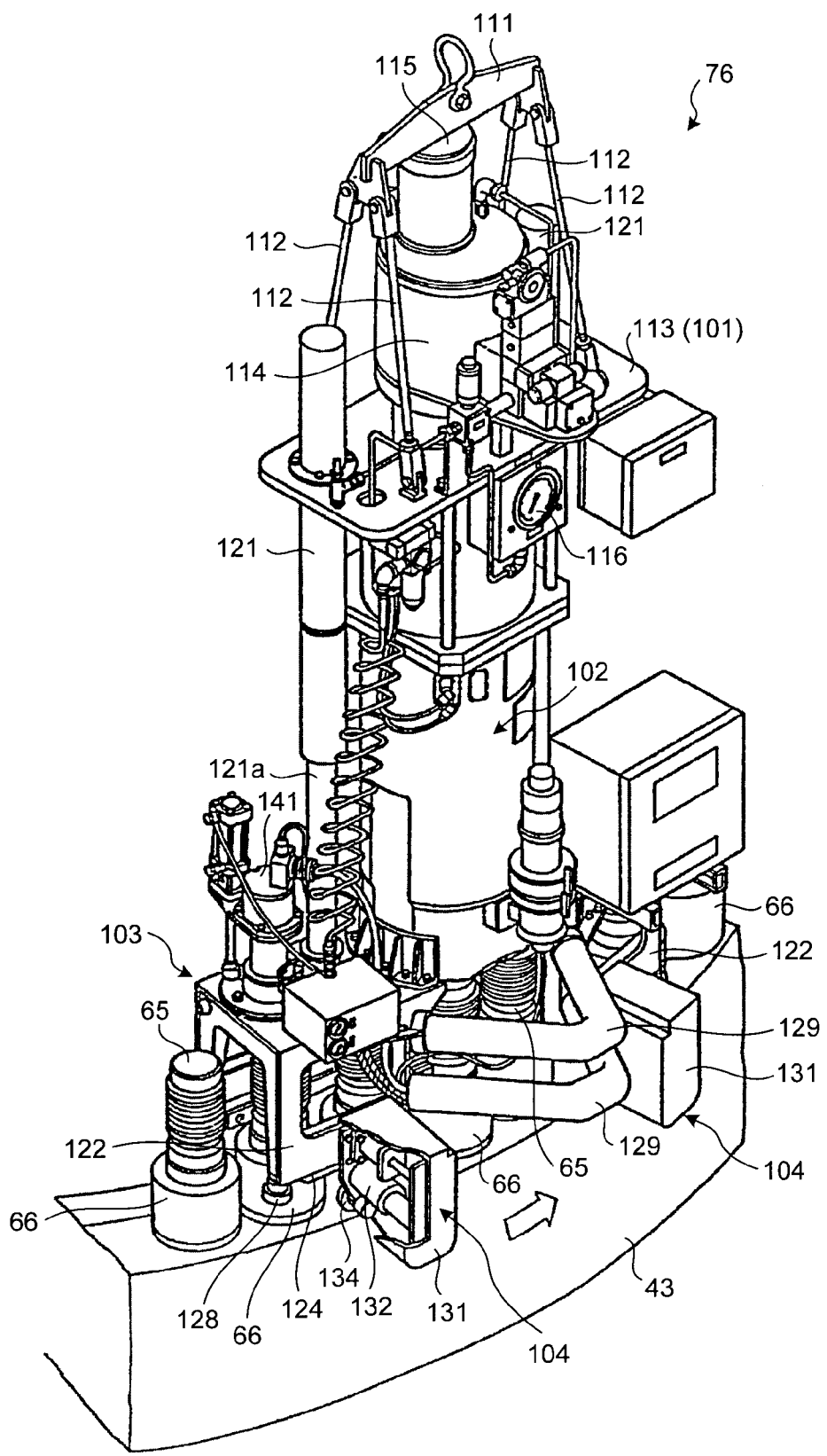
FIG. 3 is a perspective view illustrating the fastening and loosening device of the example.
Figure 4:
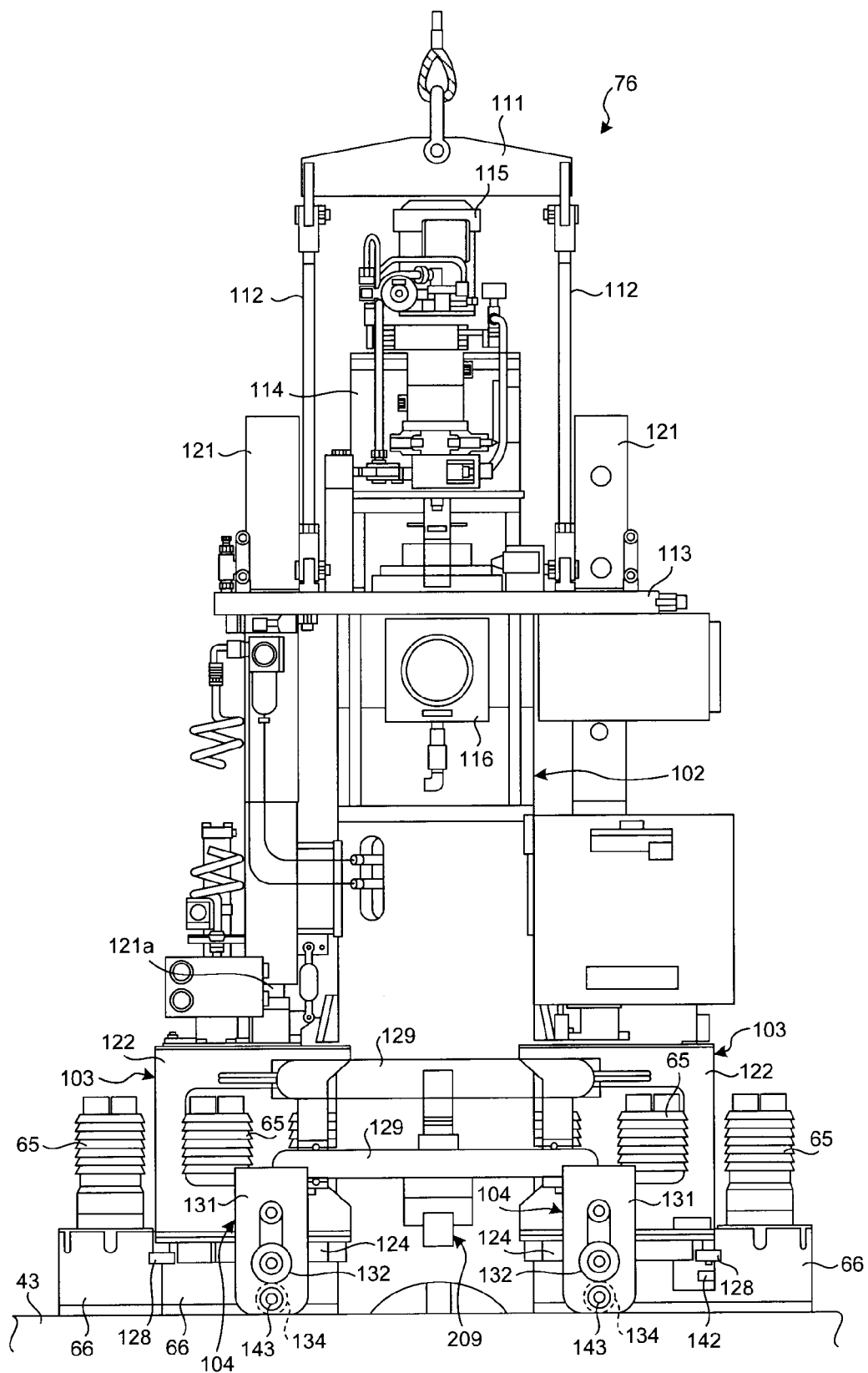
FIG. 4 is a front view illustrating the fastening and loosening device of the example.
Figure 5:
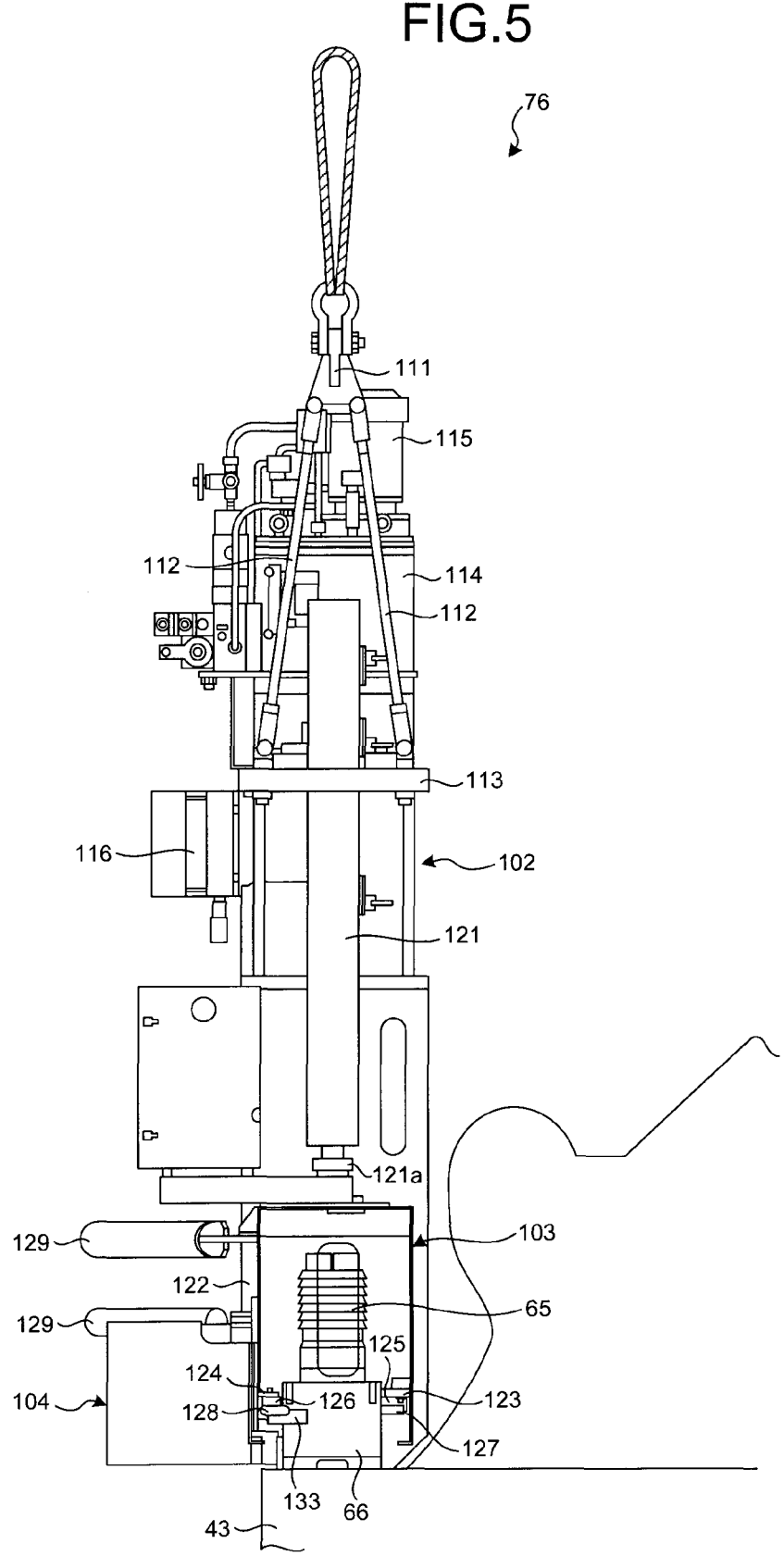
FIG. 5 is a side view illustrating the fastening and loosening device of the example.
Figure 6:
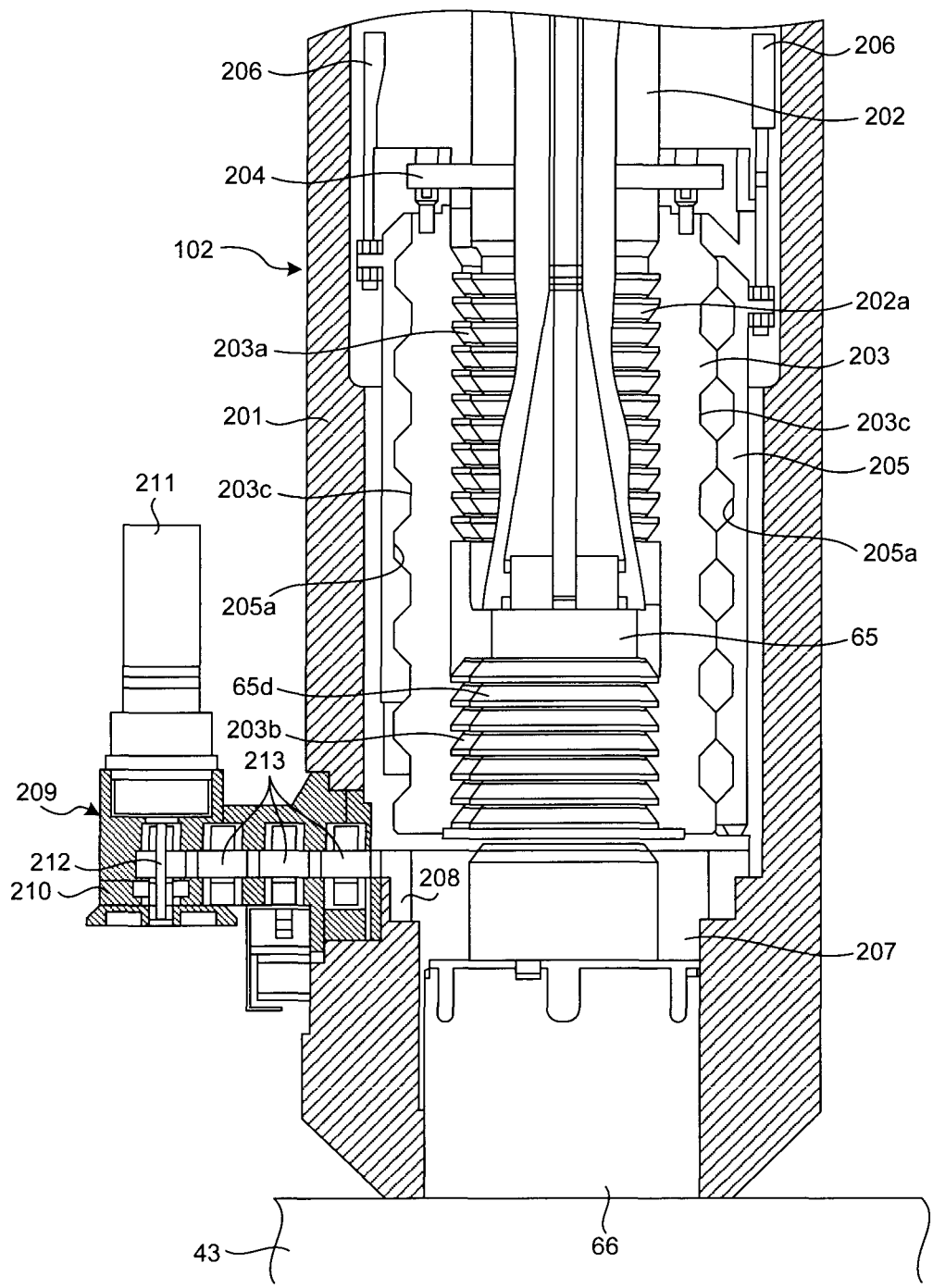
FIG. 6 is a cross-sectional view illustrating a bolt tensioner.
Figures 1, 7:
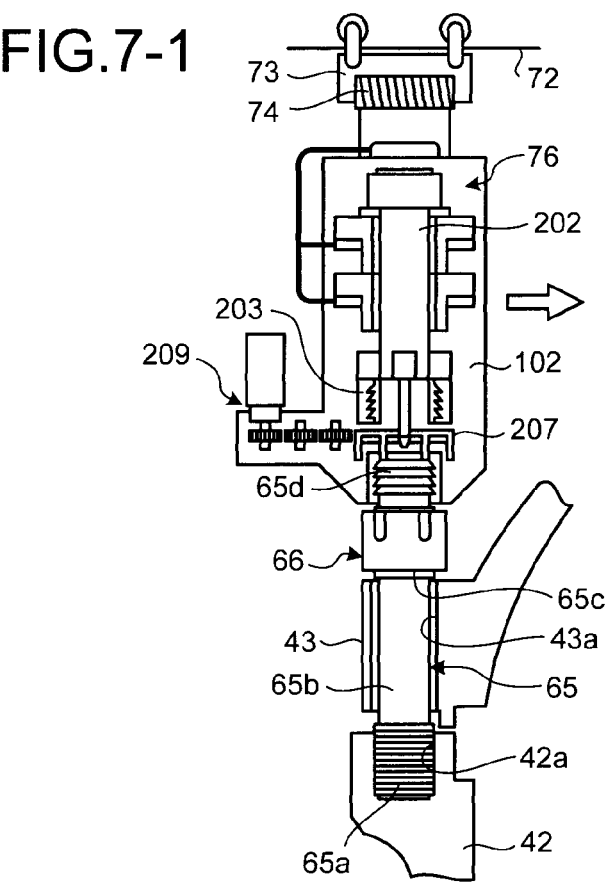
Figures 2, 7:
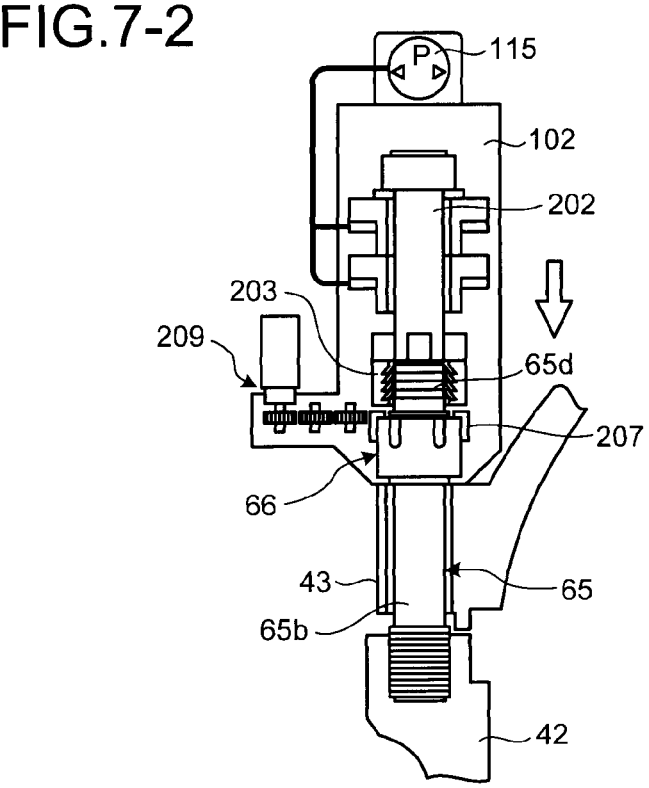
Figures 3, 7:
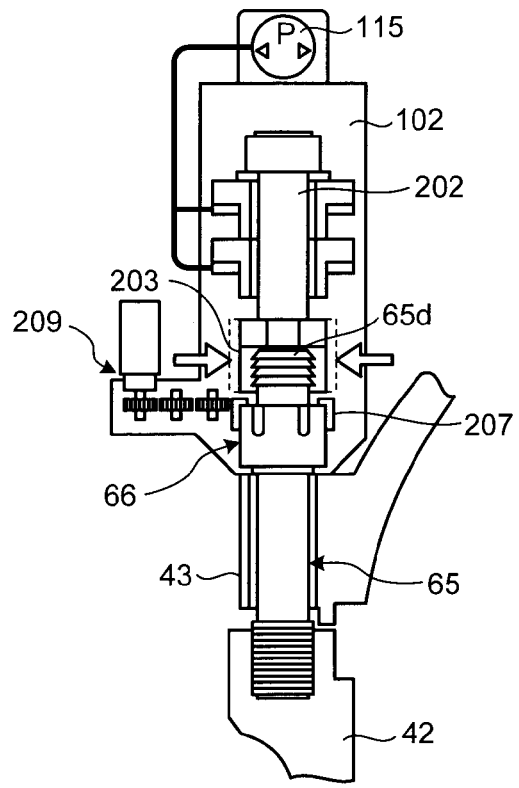
Figures 4, 7:
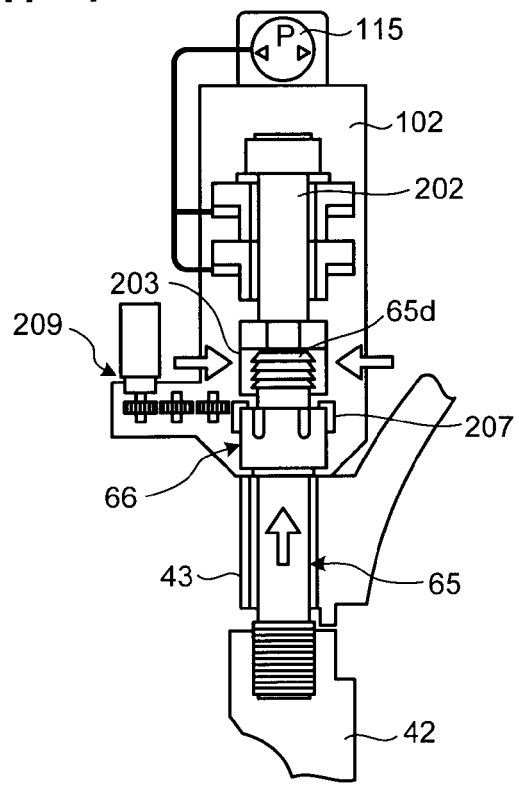
Figures 5, 7:
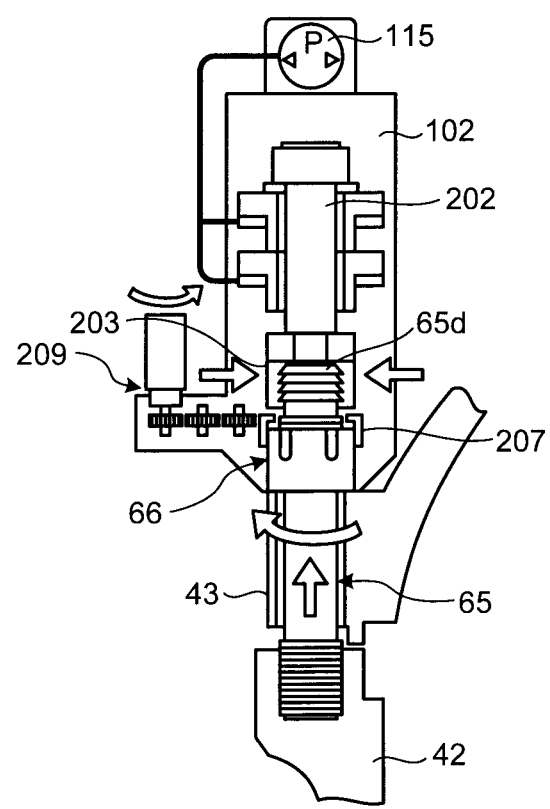
Figure 8:
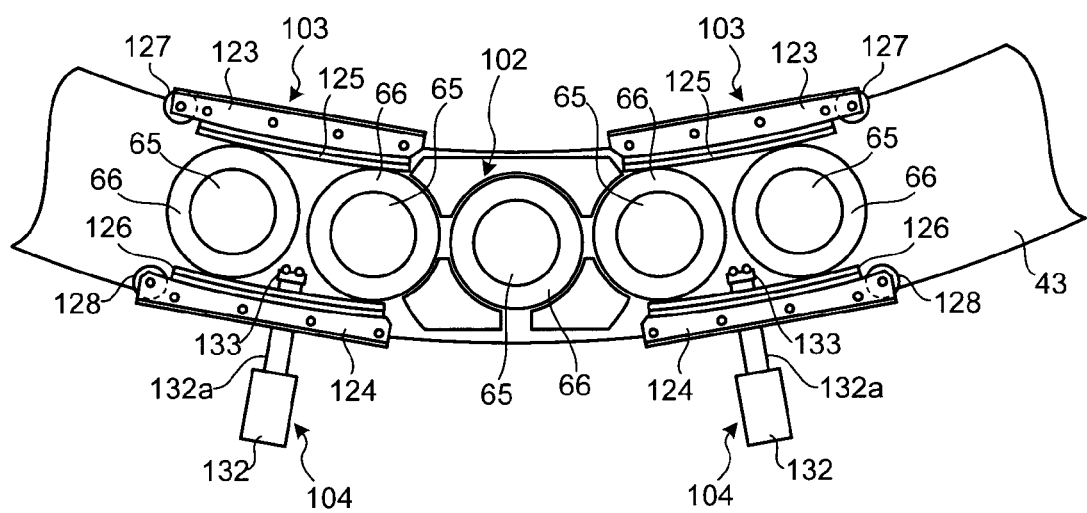
FIG. 8 is a plan view illustrating a guide device in the fastening and loosening device of the example.
Figure 9:
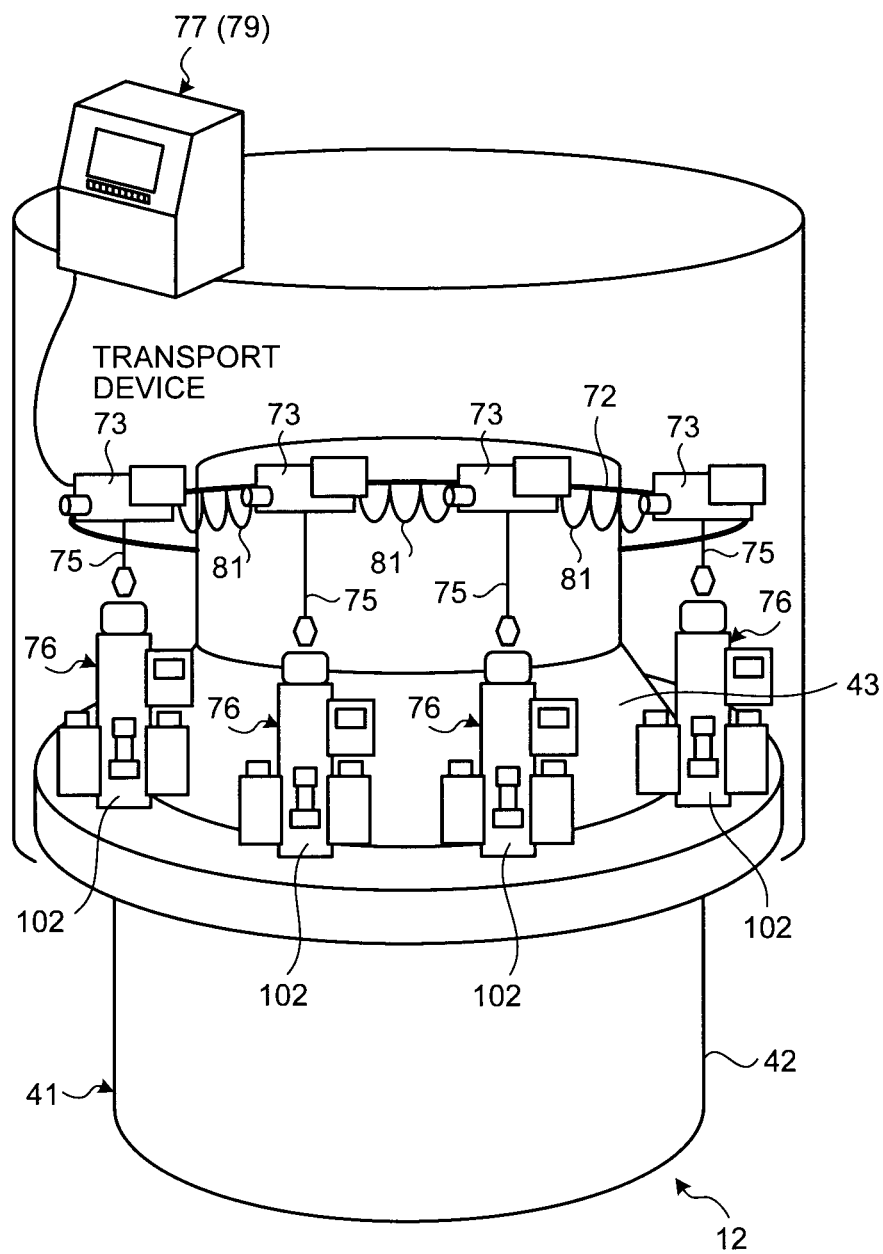
FIG. 9 is a schematic view illustrating a control system in the fastening and loosening device of the example.
Figure 10:
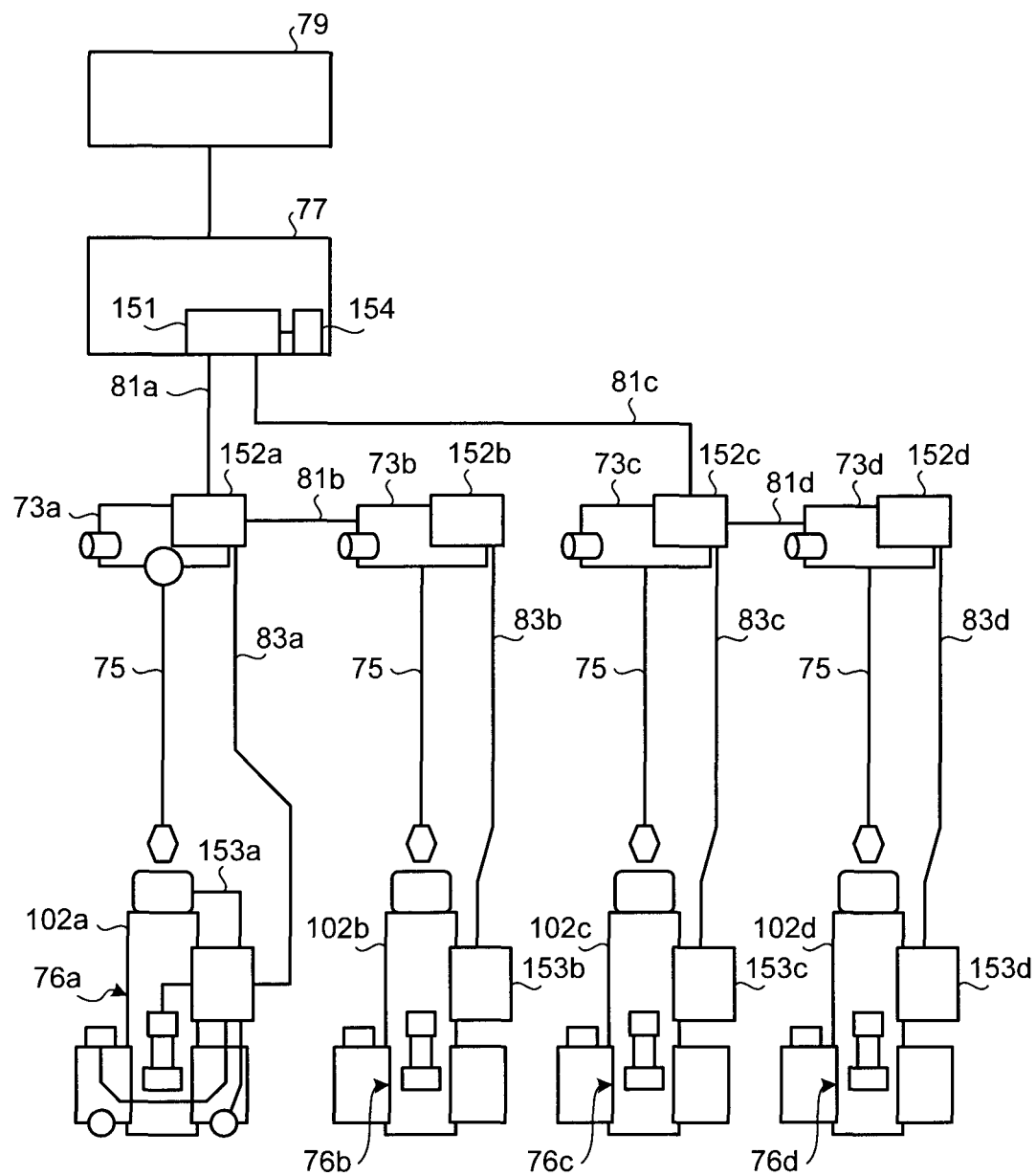
FIG. 10 is a block configuration diagram illustrating the control system in the fastening and loosening device of the example.
Figure 11:
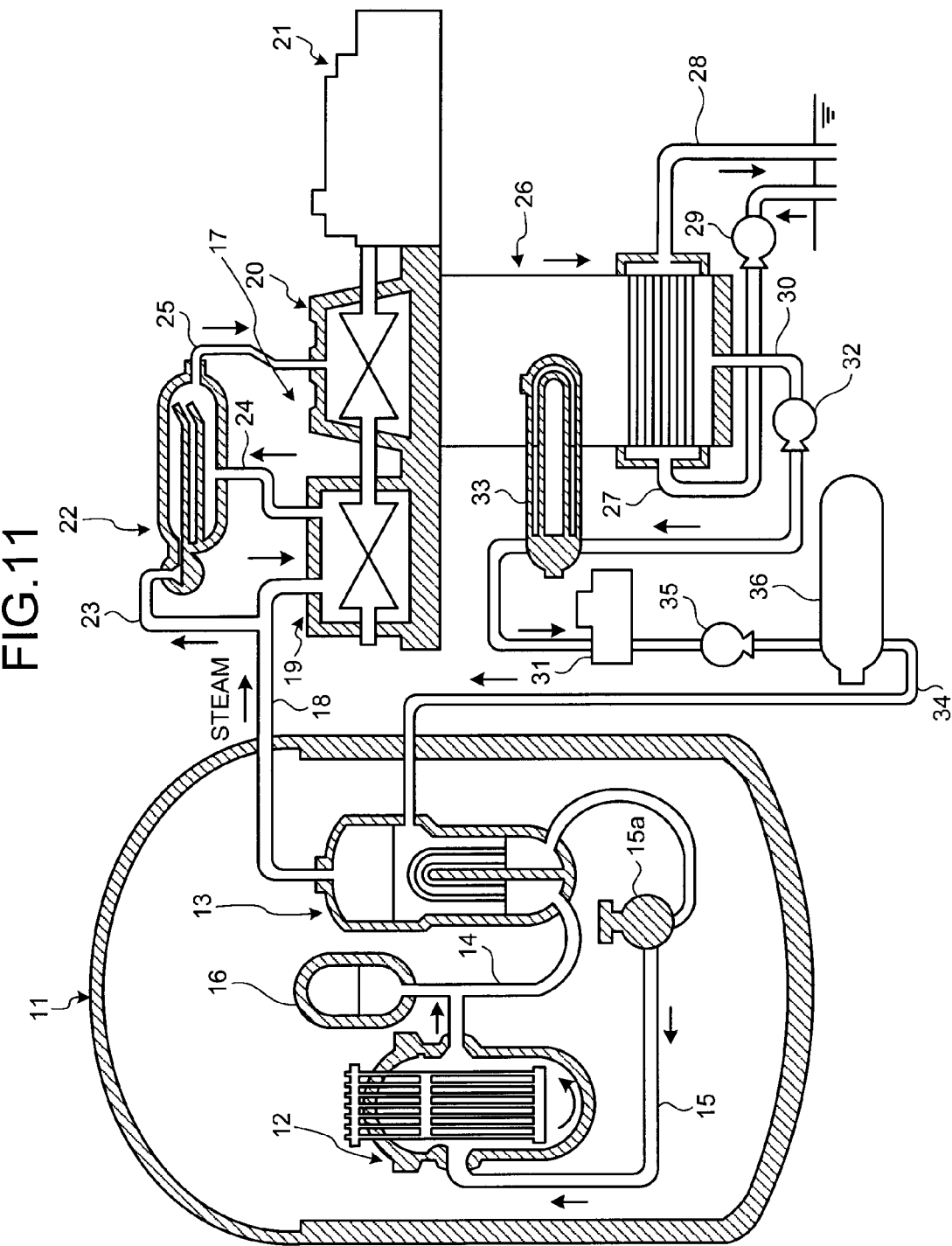
FIG. 11 is a schematic configuration diagram of a nuclear power plant.
Figure 12:
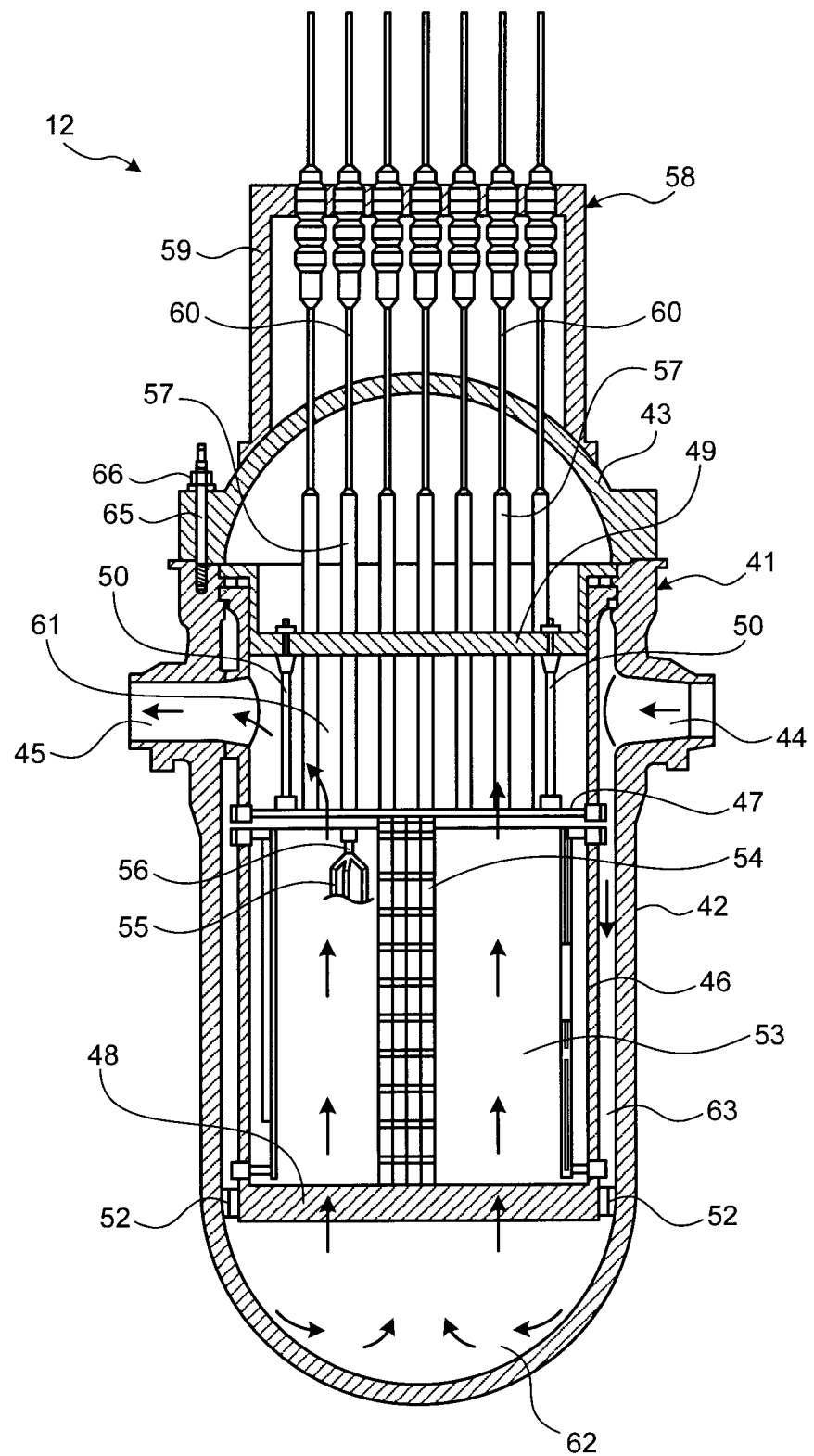
FIG. 12 is a vertical cross-sectional view illustrating a pressurized water reactor.

FIG. 1 is a perspective view illustrating the overall configuration of a fastening and loosening device related to an example of the invention, FIG. 2 is a plan view illustrating the overall configuration of the fastening and loosening device of the example, FIG. 3 is a perspective view illustrating the fastening and loosening device of the example, FIG. 4 is a front view illustrating the fastening and loosening device of the example, FIG. 5 is a side view illustrating the fastening and loosening device of the example, FIG. 6 is a cross-sectional view illustrating a bolt tensioner, FIGS. 7-1 to 7-5 are schematic views illustrating an operation of the bolt tensioner, FIG. 8 is a plan view illustrating a guide device in the fastening and loosening device of the example, FIG. 9 is a schematic view illustrating a control system in the fastening and loosening device of the example, FIG. 10 is a block configuration diagram illustrating the control system in the fastening and loosening device of the example, FIG. 11 is a schematic configuration diagram of a nuclear power plant, and FIG. 12 is a vertical cross-sectional view illustrating a pressurized water reactor.

A nuclear reactor of this example is a pressurized water reactor (PWR) that uses light water as a nuclear reactor coolant and a neutron moderator, makes high-temperature and high-pressure water that does not boil over the entire reactor internal, sends the high-temperature and high-pressure water to a steam generator to generate steam by heat exchange, and sends the steam to a turbine generator to generate electricity.

In a nuclear power plant having the pressurized water reactor of this example, as illustrated in FIG. 11, a pressurized water reactor 12 and a steam generator 13 are housed in a containment 11, the pressurized water reactor 12 and the steam generator 13 are connected through cooling water piping 14 and 15, a pressurizer 16 is provided in the cooling water piping 14, and a cooling water pump 15a is provided in the cooling water piping 15. In this case, light water is used as a moderator and primary cooling water (a coolant), and in order to suppress the boiling of the primary cooling water in a reactor internal section, a primary cooling system is controlled so as to maintain a high pressure state of about 150 to 160 atmosphere by the pressurizer 16. Therefore, in the pressurized water reactor 12, the light water as the primary cooling water is heated by low-enriched uranium or MOX as fuel (atomic fuel) and the high-temperature primary cooling water is sent to the steam generator 13 through the cooling water piping 14 in a state of being maintained at predetermined high pressure by the pressurizer 16. In this steam generator 13, heat exchange is performed between the high-pressure and high-temperature primary cooling water and secondary cooling water, and the cooled primary cooling water is returned to the pressurized water reactor 12 through the cooling water piping 15.

The steam generator 13 is connected to a steam turbine 17 through cooling water piping 18, and the steam turbine 17 includes a high-pressure turbine 19 and a low-pressure turbine 20 and also an electric generator 21 is connected thereto. Further, a moisture separator and reheater 22 is provided between the high-pressure turbine 19 and the low-pressure turbine 20, and while cooling water branch piping 23 branched from the cooling water piping 18 is connected to the moisture separator and reheater 22, the high-pressure turbine 19 and the moisture separator and reheater 22 are connected by a low-temperature reheat pipe 24 and the moisture separator and reheater 22 and the low-pressure turbine 20 are connected by a high-temperature reheat pipe 25.

In addition, the low-pressure turbine 20 of the steam turbine 17 includes a condenser 26, and an intake pipe 27 and a drainage pipe 28 which perform supply and discharge of cooling water (for example, sea water) are connected to the condenser 26. This intake pipe 27 includes a circulating water pump 29 and the other end portion thereof is disposed in the sea along with the drainage pipe 28. Then, the condenser 26 is connected to a deaerator 31 through cooling water piping 30, and a condensate pump 32 and a low-pressure feed-water heater 33 are provided in the cooling water piping 30. Further, the deaerator 31 is connected to the steam generator 13 through cooling water piping 34, and a feed-water pump 35 and a high-pressure feed-water heater 36 are provided in this cooling water piping 34.

Therefore, steam generated by performing heat exchange with the high-pressure and high-temperature primary cooling water in the steam generator 13 is sent to the steam turbine 17 (from the high-pressure turbine 19 to the low-pressure turbine 20) through the cooling water piping 18, and the steam turbine 17 is driven by this steam, and thus the electric generator 21 performs the generation of electricity. At this time, after the steam from the steam generator 13 drives the high-pressure turbine 19, the steam is subjected to removal of the moisture contained in the steam and heating in the moisture separator and reheater 22 and then drives the low-pressure turbine 20. Then, the steam which drove the steam turbine 17 is cooled using sea water in the condenser 26, thereby becoming condensate, and the condensate is heated by low-pressure steam extracted from, for example, the low-pressure turbine 20 in the low-pressure feed-water heater 33, subjected to removal of impurities such as dissolved oxygen or non-condensible gas (ammonia gas) in the deaerator 31, heated by high-pressure steam extracted from, for example, the high-pressure turbine 19 in the high-pressure feed-water heater 36, and then returned to the steam generator 13.

In the pressurized water reactor 12 applied to the nuclear power plant configured in this manner, as illustrated in FIG. 12, a reactor vessel 41 is configured to include a reactor vessel main body 42 and a reactor vessel lid 43 that is mounted on an upper portion of the reactor vessel main body 42 such that core internals can be inserted into the inside thereof, and is made such that the reactor vessel lid 43 can be opened and closed to the reactor vessel main body 42. The reactor vessel main body 42 has a cylindrical shape in which an upper portion is opened and a lower portion is spherically closed, and an inlet nozzle 44 and an outlet nozzle 45 which perform supply and discharge of the light water (the coolant) as the primary cooling water are formed in the upper portion.

A core barrel 46 having a cylindrical shape is disposed below the inlet nozzle 44 and the outlet nozzle 45 in the reactor vessel main body 42 with a predetermined gap between the core barrel 46 and the inner surface of the reactor vessel main body 42, and an upper core plate 47 which has a circular plate shape and in which a large number of flow holes (not illustrated) are formed is connected to an upper portion of the core barrel 46 and a lower core support plate 48 which likewise has a circular plate shape and in which a large number of flow holes (not illustrated) are formed is connected to a lower portion. Then, an upper core support 49 which is located above the core barrel 46 and has a circular plate shape is fixed to the inside of the reactor vessel main body 42, and the upper core plate 47, that is, the core barrel 46 is suspended and supported from the upper core support 49 through a plurality of core support rods 50. On the other hand, the lower core support plate 48, that is, the core barrel 46 is positioned and held to the inner surface of the reactor vessel main body 42 by a plurality of radial support keys 52.

A reactor internal 53 is formed by the core barrel 46, the upper core plate 47, and the lower core support plate 48, and a large number of fuel assemblies 54 are disposed at this reactor internal 53. Although not illustrated, this fuel assembly 54 is constituted by bundling of a large number of fuel rods in a grid pattern by a support grid, and while an upper nozzle is fixed to an upper end portion, a lower nozzle is fixed to a lower end portion. Then, a plurality of control rods 55 is joined together at upper end portions to be turned into a control rod cluster 56 and is made so as to be able to be inserted into the fuel assembly 54. In the upper core support 49, a large number of control rod cluster guide pipes 57 are supported to penetrate this upper core support 49, and a lower end portion thereof extends to the control rod cluster 56 of the fuel assembly 54.

A control rod driving device 58 that is a magnetic jack is provided above the reactor vessel lid 43 constituting the reactor vessel 41, and accommodated in a housing 59 integrated with the reactor vessel lid 43. Upper end portions of the large number of control rod cluster guide pipes 57 extend to the control rod driving device 58, and a control rod cluster driving shaft 60 extending from this control rod driving device 58 extends to the fuel assembly 54 through the inside of the control rod cluster guide pipe 57 and is made so as to be able to hold the control rod cluster 56. Further, although not illustrated, in the upper core support 49, a large number of in-core instrument guide pipes are supported to penetrate this upper core support 49, and a lower end portion thereof extends to the fuel assembly 54 and is made so as to be able to insert a sensor capable of measuring a neutron flux therein.

This control rod driving device 58 is provided to extend in a vertical direction, is connected to the control rod cluster 56, and also vertically moves the control rod cluster driving shaft 60 in which a plurality of circumferential grooves is disposed at an equal pitch in a longitudinal direction in the surface thereof, by the magnetic jack, thereby controlling the output of a nuclear reactor.

Therefore, nuclear fission in the reactor internal 53 is controlled by inserting the control rod 55 into the fuel assembly 54 by moving the control rod cluster driving shaft 60 by the control rod driving device 58, the light water filled up in the reactor vessel 41 is heated by the generated thermal energy, and the light water having high temperature is discharged from the outlet nozzle 45 and sent to the steam generator 13, as described above. That is, uranium or plutonium as the fuel constituting the fuel assembly 54 fissions, thereby emitting neutrons, and the light water as the moderator and the primary cooling water reduces the kinetic energy of the emitted fast neutrons, thereby turning the neutrons into thermal neutrons, makes it easy for new nuclear fission to occur, and also takes the generated heat, thereby performing cooling. Further, the number of neutrons that are generated in the reactor internal 53 is adjusted by inserting the control rod 55 into the fuel assembly 54, and when urgently stopping the nuclear reactor, the control rod 55 is rapidly inserted into the reactor internal 53.

Further, in the reactor vessel 41, an upper plenum 61 which communicates with the outlet nozzle 45 is formed above the reactor internal 53 and also a lower plenum 62 is formed below the reactor internal 53. Then, a downcomer section 63 which communicates with the inlet nozzle 44 and the lower plenum 62 is formed between the reactor vessel 41 and the core barrel 46. Therefore, the light water flows from the four inlet nozzles 44 into the reactor vessel main body 42, flows downward through the downcomer section 63, thereby reaching the lower plenum 62, is guided upward by the spherical inner surface of the lower plenum 62, thereby moving up, passes through the lower core support plate 48, and then flows into the reactor internal 53. The light water that has flowed into this reactor internal 53 absorbs thermal energy that is generated from the fuel assembly 54 constituting the reactor internal 53, thereby cooling the fuel assembly 54, is made to have high temperature, then moves up to the upper plenum 61 through the upper core plate 47, and is discharged through the outlet nozzle 45.

The reactor vessel 41 configured in this manner is constituted by the reactor vessel main body 42 and the reactor vessel lid 43, as described above, and the reactor vessel lid 43 is detachably mounted on the upper portion of the reactor vessel main body 42 by a plurality of stud bolts 65 and a plurality of nuts 66. In this case, the stud bolt 65 includes a lower threaded portion 65a, a penetration portion 65b, an upper threaded portion 65c, and a parallel groove portion 65d, as illustrated in detail in FIG. 7-1. Then, the stud bolt 65 in which the nut 66 is screwed onto the upper threaded portion 65c can be fastened or loosened by screwing the nut 66 while applying tension to the stud bolt 65 in an axial direction (here, upward) away from the reactor vessel main body 42 in a state where the penetration portion 65b passes through a mounting hole 43a formed in the reactor vessel lid 43 and the lower threaded portion 65a is screwed into a threaded hole 42a formed in the reactor vessel main body 42, and thus the reactor vessel lid 43 can be mounted or dismounted to the reactor vessel main body 42.

Here, members to be fastened in this invention are the reactor vessel main body 42 and the reactor vessel lid 43. Then, the fastening and loosening device of this example is a device capable of performing mounting or removal of the reactor vessel lid 43 to the reactor vessel main body 42 by using the plurality of stud bolts 65 and nuts 66. Hereinafter, the fastening and loosening device of this example will be described in detail.

In this example, as illustrated in FIGS. 1 and 2, a support disk 59a of the housing 59 is supported on a building 11a constituting the containment 11 (refer to FIG. 11) by a plurality of support rods 71. A guide rail 72 is fixed to an outer peripheral portion of this support disk 59a and four transport devices (electric trolley hoists) 73 are movably supported thereon. Then, each of the four transport devices 73 includes a lift device 74 and a fastening and loosening device 76 is suspended and supported through a hanging cable 75 and also made so as to be able to move up and down. In this case, the four transport devices 73 and the fastening and loosening devices 76 include substantially the same configuration and are disposed at equal intervals (90-degree intervals) in a circumferential direction.

To a transport operating device 77, a tension control device 78 is connected and a power supply section 79 and an air pressure source 80 are also connected. Then, the transport operating device 77 is connected to each transport device 73 by a power cable 81 and also connected to each fastening and loosening device 76 through each transport device 73 by a pneumatics hose 82.

The fastening and loosening device 76 is for performing fastening or loosening by screwing and arranging the plurality of stud bolts 65 to the outer peripheral portions of the reactor vessel main body 42 and the reactor vessel lid 43, screwing the nut 66 onto each of the plurality of stud bolts 65, and rotating the nut 66 while applying tension to the stud bolt 65 in the axial direction away from the reactor vessel main body 42, as described above.

That is, the fastening and loosening device 76 is configured to include a device main body 101, a bolt tensioner 102, two guide devices 103, and two positioning devices 104, as illustrated in FIGS. 3 to 5.

A hanging fixture 111 can be suspended and supported on the hanging cable 75 of the lift device 74 in the transport device 73, and a support plate 113 is supported by a plurality of hanging rods 112. The device main body 101 is configured to include the hanging fixture 111, the hanging rods 112, the support plate 113, and the like. Therefore, an upper portion of the device main body 101 is supported on the transport device 73, whereby the device main body 101 is supported so as to be able to move along an array direction of the stud bolts 65 (the circumferential direction of the reactor vessel main body 42 and the reactor vessel lid 43).

The bolt tensioner 102 is supported such that an upper portion thereof passes through a central portion of the support plate 113, and an oil tank 114, a hydraulic pump unit 115, and a pressure gauge 116 are disposed at the upper portion. Therefore, since the bolt tensioner 102 is mounted on the device main body 101, the bolt tensioner 102 can move along the axial direction of the stud bolt 65 by an operation of the lift device 74.

In the bolt tensioner 102, as illustrated in FIG. 6, a housing 201 having a cylindrical shape is made such that an upper portion thereof is engaged and fixed to the support plate 113 and a leading end portion thereof can come into contact with the upper surface of the reactor vessel lid 43. A puller bar 202 has a cylindrical shape having a smaller diameter than the housing 201 and is accommodated in a central portion of the housing 201. This puller bar 202 is movably fitted onto the inner peripheral surface of the housing 201 through a piston (not illustrated) and made so as to be able to move along an axial direction (a vertical direction) by oil pressure which is supplied and discharged by the hydraulic pump unit 115. Then, the puller bar 202 includes a parallel groove portion 202a formed at a lower end portion thereof.

A puller bar socket 203 has a cylindrical shape quadrisected in a circumferential direction and is disposed between the housing 201 and the lower end portion of the puller bar 202 and the stud bolt 65. An upper end portion of the puller bar socket 203 is supported on a lower portion of the puller bar 202 through a collar 204 and each member quadrisected is supported to be able to move in a radial direction and be biased and supported to the outside. Then, in the puller bar socket 203, an upper engagement groove portion 203a which is engaged with the parallel groove portion 202a of the puller bar 202 is formed in the inner peripheral surface of the upper portion and also a lower engagement groove portion 203b which is engaged with the parallel groove portion 65d of the stud bolt 65 is formed in the inner peripheral surface of the lower portion. Further, the puller bar socket 203 includes a concavo-convex portion 203c formed in the outer peripheral surface thereof.

Further, a locking ring 205 has a cylindrical shape and is disposed between the housing 201 and the puller bar socket 203. In this locking ring 205, a concavo-convex portion 205a capable of being fitted to the concavo-convex portion 203c of the puller bar socket 203 is formed in the inner peripheral surface thereof. Then, the locking ring 205 is made so as to be able to move up and down by a plurality of air cylinders 206 mounted on the inner peripheral surface of the housing 201. Therefore, when the locking ring 205 is at an elevated position, as illustrated on the left side in FIG. 6, the puller bar socket 203 moves outward in the radial direction, and thus the concavo-convex portion 205a is fitted to the concavo-convex portion 203c of the puller bar socket 203 and the respective engagement groove portions 203a and 203b are not engaged with the parallel groove portion 202a of the puller bar 202 and the parallel groove portion 65d of the stud bolt 65. On the other hand, when the locking ring 205 is at a lowered position, as illustrated on the right side in FIG. 6, the concavo-convex portion 205a presses the concavo-convex portion 203c of the puller bar socket 203, and thus the puller bar socket 203 moves inward in the radial direction and the respective engagement groove portions 203a and 203b are engaged with the parallel groove portion 202a of the puller bar 202 and the parallel groove portion 65d of the stud bolt 65.

In the housing 201, a nut socket 207 is rotatably supported on an inner peripheral portion of a lower end thereof and a following gear 208 is fixed to an outer peripheral portion. The nut socket 207 is made so as to be able to move relatively to the nut 66 in the axial direction and be able to integrally move in the circumferential direction. Further, in the housing 201, a nut rotating device 209 which rotates the nut socket 207 is mounted on the outer peripheral portion of the lower end thereof. The nut rotating device 209 is configured to include a case 210 which is fixed to the housing 201, an electric servo motor 211, a driving gear 212, and three intermediate gears 213. Therefore, when the driving gear 212 is positively rotated by the electric servo motor 211, the rotational driving force thereof is transmitted to the following gear 208 through each intermediate gear 213, thereby rotating the nut socket 207, then rotating the nut 66, and thus, results in being able to be fastened. On the other hand, when the driving gear 212 is reversely rotated by the electric servo motor 211, the rotational driving force thereof is transmitted to the following gear 208 through each intermediate gear 213, thereby rotating the nut socket 207, then rotating the nut 66, and thus, results in being able to be loosened.

Therefore, first, as illustrated in FIG. 7-1, the fastening and loosening device 76 is moved by the transport device 73 and stopped at a predetermined position, that is, a position where the bolt tensioner 102, the stud bolt 65, and the nut 66 are located. Next, as illustrated in FIG. 7-2, the fastening and loosening device 76 is lowered by the lift device 74, and thus the bolt tensioner 102 is engaged with the stud bolt 65 and the nut 66. Then, as illustrated in FIG. 7-3, the puller bar socket 203 is moved inward in the radial direction, thereby chucking the parallel groove portion 65d of the stud bolt 65.

In this state, as illustrated in FIG. 7-4, the hydraulic pump unit 115 is operated, whereby the puller bar 202 is raised, thereby applying tension to the stud bolt 65 in the axial direction (upward) away from the reactor vessel main body 42. Then, as illustrated in FIG. 7-5, the nut rotating device 209 is operated, whereby the nut socket 207 is rotated, thereby rotating the nut 66, and thus fastening or loosening can be performed.

Further, in the fastening and loosening device 76, as illustrated in FIGS. 3 to 5, the guide devices 103 are provided backward and forward in the moving direction of the device main body 101 to the bolt tensioner 102. The front and rear guide devices 103 have shapes symmetrical to the center line of the bolt tensioner 102 and include substantially the same configuration.

That is, in each of front and rear cylinders 121, a main body thereof is fixed to the support plate 113 and a box body 122 having an inverted U-shaped cross-section is connected to a leading end portion of a piston rod 121a extending downward. In addition, in the cylinder 121, the longest extension position of the piston rod 121a is restricted. In the box body 122, as illustrated in detail in FIG. 8, an inner guide member 123 and an outer guide member 124 are mounted on both left and right sides in the moving direction of the device main body 101. In these respective guide members 123 and 124, guide pieces 125 and 126 are respectively fixed to the sides facing each other and each of this guide pieces 125 and 126 has a curved shape along the array direction (the circumferential direction) of the stud bolts 65. In this case, each of the guide pieces 125 and 126 is made so as to be able to come into contact with the outer peripheries of two (or three or more) nuts 66 adjacent to each other. Further, in the respective guide members 123 and 124, guide rollers 127 and 128 each having a rotational axis following up and down are mounted on an end portion on the front side and an end portion on the rear side.

In this case, the guide device 103 is constituted by the box body 122, the guide members 123 and 124, the guide pieces 125 and 126, the guide rollers 127 and 128, and the like. Further, the inside of the cylinder 121 is filled with oil, whereby the cylinder 121 functions as a damper, and even if the bolt tensioner 102 moves up and down along with the device main body 101, the piston rod 121a expands and contracts, whereby the device main body 101 and the guide device 103 move relatively. In addition, in the two guide devices 103, the respective box bodies 122 are connected by two upper and lower connection members 129 at the outside in the circumferential direction and predetermined rigidity is secured.

Therefore, the guide pieces 125 and 126 or the guide rollers 127 and 128 in the respective guide members 123 and 124 can guide a lower portion of the device main body 101 by coming into contact with the outer peripheries of the nuts 66 screwed onto the respective stud bolts 65 from both left and right sides in the moving direction of the device main body 101.

Further, in the fastening and loosening device 76, as illustrated in FIGS. 3 to 5, the positioning devices 104 are provided along with the guide devices 103 backward and forward in the moving direction of the device main body 101 to the bolt tensioner 102. The front and rear positioning devices 104 are mounted on the guide devices 103, have shapes symmetrical to the center line of the bolt tensioner 102, and include substantially the same configuration.

That is, a box-shaped case 131 is fixed to a side portion (the outside in the circumferential direction of the reactor vessel lid 43) of the box body 122 of the guide device 103 and an air cylinder 132 is mounted in the case 131. The air cylinder 132 includes a piston rod 132a (refer to FIG. 8) capable of expanding and contracting toward the inside in the circumferential direction of the reactor vessel lid 43, and a positioning member 133 which is engaged between the nuts 66 adjacent to each other from the outside in the circumferential direction is mounted on a leading end portion. Further, the case 131 is made such that a wheel 134 is mounted on a lower portion which is located on the box body 122 side, the load of the guide device 103 and the positioning device 104 is supported by the wheel 134, and the wheel 134 can roll on the upper surface of the reactor vessel lid 43.

In this case, the positioning device 104 is constituted by the case 131, the air cylinder 132, the positioning member 133, and the like.

Therefore, when at a predetermined position, the air cylinder 132 is operated, thereby expanding the piston rod 132a, the positioning member 133 is engaged between the nuts 66 adjacent to each other, whereby the device main body 101 can be positioned at the predetermined position to the moving direction thereof.

In addition, an elongation amount detection device 141 which detects the amount of elongation of the stud bolt 65 before and after work by the fastening and loosening device is provided at the box body 122 of the guide device 103 on the front side, and whether tension appropriately acts on the bolt tensioner 102 and thus fastening performed is detected on the basis of the detection result of the elongation amount detection device 141. Further, a nut detection sensor (a photosensor) 142 which detects the nut 66 is provided at the box body 122 of the guide device 103 on the front side, a rotary encoder 143 which detects the number of rotations of the wheel 134 is provided at the case 131 of the positioning device 104, and the movement position of the device main body 101, that is, the bolt tensioner 102 is detected on the basis of the detection results of the nut detection sensor 142 and the rotary encoder 143.

Then, in this example, as illustrated in FIG. 9, the transport operating device 77 is connected to the power supply section 79 and also connected to each transport device 73 and each fastening and loosening device 76 (bolt tensioner 102) by the power cable 81. In this case, each transport device 73 is permanently installed at the reactor vessel lid 43 and each fastening and loosening device 76 (bolt tensioner 102) is made so as to be able to be mounted or dismounted to the reactor vessel lid 43.

That is, as illustrated in FIG. 10, the single transport operating device 77 is connected to two transport devices 73a and 73c by two power cables 81a and 81c, and the two transport devices 73a and 73c are respectively connected to transport devices 73b and 73d by two power cables 81b and 81d. Then, the transport devices 73a, 73b, 73c, and 73d are respectively connected to fastening and loosening devices 76a, 76b, 76c, and 76d (bolt tensioners 102a, 102b, 102c, and 102d) by power cables 83a, 83b, 83c, and 83d.

The transport operating device 77 includes a control panel (PLC: Programmable Logic Controller) 151, the transport devices 73a, 73b, 73c, and 73d respectively include control panels (PLCs) 152a, 152b, 152c, and 152d, and the fastening and loosening devices 76a, 76b, 76c, and 76d (the bolt tensioners 102a, 102b, 102c, and 102d) respectively include control panels (PLCs) 153a, 153b, 153c, and 153d. In this case, each control panel 151 can control the respective transport devices 73a, 73b, 73c, and 73d through the control panels 152a, 152b, 152c, and 152d by a program and can also control the respective fastening and loosening devices 76a, 76b, 76c, and 76d (bolt tensioners 102a, 102b, 102c, and 102d) through the control panels 153a, 153b, 153c, and 153d by a program. Further, the control panels 152a, 152b, 152c, and 152d can control the respective transport devices 73a, 73b, 73c, and 73d by programs and the control panels 153a, 153b, 153c, and 153d can control the respective fastening and loosening devices 76a, 76b, 76c, and 76d (bolt tensioners 102a, 102b, 102c, and 102d) by a program.

In addition, each of the control panels 152a, 152b, 152c, and 152d and the control panels 153a, 153b, 153c, and 153d includes substantially the same configuration. Further, the control panels 152a, 152b, 152c, and 152d or the control panels 153a, 153b, 153c, and 153d include programs to control only the minimum functions of the respective transport devices 73a, 73b, 73c, and 73d or the respective fastening and loosening devices 76a, 76b, 76c, and 76d (bolt tensioners 102a, 102b, 102c, and 102d).

In addition, in this example, the transport operating device 77 (the control panel 151) functions as a main control device, the control panels 152a, 152b, 152c, and 152d function as first control devices, and the control panels 153a, 153b, 153c, and 153d function as second control devices. Then, the power cables 81a, 81b, 81c, and 81d function as a first network and the power cables 83a, 83b, 83c, and 83d function as a second network.

Then, the transport operating device 77 (the control panel 151) functions as a fault diagnosis device that detects a fault of each device by the power cables 81a, 81b, 81c, and 81d which connect the transport operating device 77 (the control panel 151) and the control panels 152a, 152b, 152c, and 152d. That is, the transport operating device 77 (the control panel 151) performs signal loop control to transmit a fault diagnosis signal to the control panels 152a, 152b, 152c, and 152d by the power cables 81a, 81b, 81c, and 81d and also receive the transmitted fault diagnosis signal, thereby being able to detect a fault of the transport operating device 77 (the control panel 151) or the control panels 152a, 152b, 152c, and 152d and disconnection of the power cables 81a, 81b, 81c, and 81d.

Here, as for the power cables 81a, 81b, 81c, and 81d, two sets for transmission from the transport operating device 77 (the control panel 151) and two sets for reception are provided. That is, usually, a signal loop is formed by using one of the power cables for transmission and one of the receiving power cables. Then, when the power cable for transmission and the receiving power cable have been disconnected, a signal loop is formed by using another power cable for transmission and another receiving power cable.

Further, the transport operating device 77 (the control panel 151) includes a switching device 154 capable of switching a control form. A first control form is a control form in which the transport operating device 77 (the control panel 151) can control the respective transport devices 73a, 73b, 73c, and 73d through the control panels 152a, 152b, 152c, and 152d and also control the respective fastening and loosening devices 76a, 76b, 76c, and 76d (bolt tensioners 102a, 102b, 102c, and 102d) through the control panels 153a, 153b, 153c, and 153d. A second control form is a form in which independently of the transport operating device 77 (the control panel 151), the control panels 152a, 152b, 152c, and 152d can control the respective transport devices 73a, 73b, 73c, and 73d and also the control panels 153a, 153b, 153c, and 153d can control the respective fastening and loosening devices 76a, 76b, 76c, and 76d (bolt tensioners 102a, 102b, 102c, and 102d).

Therefore, in the fastening and loosening device of this example, as an inspection before work to mount or dismount the reactor vessel lid 43 is performed, the transport operating device 77 (the control panel 151) performs the operational tests of the control panels 152a, 152b, 152c, and 152d, the respective transport devices 73a, 73b, 73c, and 73d, and the power cables 81a, 81b, 81c, and 81d. In this case, the respective fastening and loosening devices 76a, 76b, 76c, and 76d (bolt tensioners 102a, 102b, 102c, and 102d) are mounted on the respective transport devices 73a, 73b, 73c, and 73d and the operational tests of the control panels 153a, 153b, 153c, and 153d, the respective fastening and loosening devices 76a, 76b, 76c, and 76d (bolt tensioners 102a, 102b, 102c, and 102d), and the power cables 83a, 83b, 83c, and 83d may be performed simultaneously.

That is, when the control panel 151 of the transport operating device 77 outputs a fault diagnosis signal, the fault diagnosis signal is input to the control panels 152a and 152c by the power cables 81a and 81c and further input to the control panels 152b and 152d by the power cables 81b and 81d. Then, the control panels 152b and 152d output the received fault diagnosis signal and this fault diagnosis signal is input to the control panels 152a and 152c by the power cables 81b and 81d and input to the control panel 151 by the power cables 81a and 81c. Here, the output fault diagnosis signal is returned to the control panel 151 of the transport operating device 77, whereby the control panel 151 can detect that there is no fault in the control panel 151 or the control panels 152a, 152b, 152c, and 152d and that the power cables 81a, 81b, 81c, and 81d are not disconnected. On the other hand, when the output fault diagnosis signal is not returned, the control panel 151 of the transport operating device 77 detects the arrival position of the fault diagnosis signal, thereby being able to detect a fault of the control panel 151 or the control panels 152a, 152b, 152c, and 152d and disconnection of the power cables 81a, 81b, 81c, and 81d.

Then, when a fault has occurred in the control panel 151 of the transport operating device 77, the respective control panels 152a, 152b, 152c, and 152d control the respective transport devices 73a, 73b, 73c, and 73d, thereby performing work. Further, when a fault has occurred in any of the control panels 152a, 152b, 152c, and 152d, the control panel 151 controls the respective transport devices 73a, 73b, 73c, and 73d, thereby performing work. In addition, when the power cables 81a, 81b, 81c, and 81d have been disconnected, since the power cables 81a, 81b, 81c, and 81d are double-tracked, another power cable is used. Then, replacement work of the faulty control panel 151 or the control panels 152a, 152b, 152c, and 152d is performed, as necessary. In addition, the control panel 151 of the transport operating device 77 can also detect faults of various sensors in the respective transport devices 73a, 73b, 73c, and 73d.

Further, when the respective fastening and loosening devices 76a, 76b, 76c, and 76d (bolt tensioners 102a, 102b, 102c, and 102d) have been mounted on the respective transport devices 73a, 73b, 73c, and 73d, the control panel 151 of the transport operating device 77 outputs a fault diagnosis signal in the same manner as described above, thereby detecting faults of the control panels 153a, 153b, 153c, and 153d or the respective fastening and loosening devices 76a, 76b, 76c, and 76d (bolt tensioners 102a, 102b, 102c, and 102d) or disconnection of the power cables 83a, 83b, 83c, and 83d.

Here, an operation of the fastening and loosening device of this example described above will be described.

In the fastening and loosening device of this example, as illustrated in FIGS. 1 and 2, in a case of removing the reactor vessel lid 43 from the reactor vessel main body 42, first, the fastening and loosening devices 76 are suspended and supported on the four transport devices 73 through the lift devices 74 and the fastening and loosening devices 76 are moved down by the lift devices 74, thereby being set up to the stud bolts 65 and the nuts 66 fastened to the reactor vessel main body 42 and the reactor vessel lid 43. Then, the bolt tensioner 102 is moved up along with the device main body 101, and thus the bolt tensioner 102 is disposed above the stud bolt 65 and the nut 66. In this case, the front and rear guide devices 103 are engaged with the arranged nuts 66.

In this state, the transport device 73 is operated, thereby moving the fastening and loosening device 76 along the array direction of the stud bolts 65 and the nuts 66. Then, when the bolt tensioner 102 is moved to a position where the bolt tensioner 102 vertically faces the stud bolt 65 and the nut 66, the operation of the transport device 73 is stopped and the positioning device 104 is operated, thereby performing the positioning of the bolt tensioner 102. That is, the bolt tensioner 102 is just suspended from the transport device 73 along with the device main body 101, and a slight gap is provided between the guide device 103 and the nut 66 in order for the guide device 103 to move, and thus accurate positioning between the bolt tensioner 102 and the stud bolt 65 and the nut 66 becomes difficult. Therefore, when the positioning member 133 is engaged between the nuts 66 adjacent to each other from the outside by operating the positioning device 104, the nuts 66 are sandwiched by the positioning device 104 (the positioning member 133) and the guide device 103 (the inner guide member 123), and thus accurate positioning of the bolt tensioner 102 becomes possible.

When accurate positioning between the bolt tensioner 102 and the stud bolt 65 and the nut 66 is completed, the bolt tensioner 102 is operated in this state, thereby loosening the nut 66. That is, the nut 66 is loosened by reversely rotating the nut 66 while applying tension to the stud bolt 65 in the axial direction away from the reactor vessel main body 42.

When the loosening of one of the nuts 66 is completed, the bolt tensioner 102 is moved up along with the device main body 101 by the lift device 74, and thus this bolt tensioner 102 is spaced above the stud bolt 65 and the nut 66. At this time, the cylinder 121 is expanded by the own weight of the guide device 103, the positioning device 104, and the like, whereby the front and rear guide devices 103 and the positioning devices 104 are engaged with the arranged nuts 66. In this state, as described above, when the fastening and loosening device 76 is moved along the array direction of the stud bolts 65 and the nuts 66 by the transport device 73, the guide devices 103 and the positioning devices 104 roll on the upper surface of the reactor vessel lid 43 through the wheels 134. Then, when the bolt tensioner 102 moves to a position where the bolt tensioner 102 vertically faces the stud bolt 65 and the nut 66, the operation of the transport device 73 is stopped, and hereinafter, the same work as that described above is repeatedly performed, whereby the plurality of nuts 66 is loosened in sequence.

In addition, the four fastening and loosening devices 76 are disposed at equal intervals in the circumferential direction, and the respective fastening and loosening devices 76 operate in synchronization, thereby being able to loosen the nuts 66 without making unbalanced load act on the stud bolts 65 and the nuts 66 fastened to the reactor vessel main body 42 and the reactor vessel lid 43. Then, when the loosening work of all the nuts is completed, the four transport devices 73 are stopped, and the respective lift devices 74 are operated, thereby lifting all the fastening and loosening devices 76, and all the fastening and loosening devices 76 are removed by using a crane device (not illustrated). Then, after the stud bolts 65 are rotated and removed by using a rotating device (not illustrated), the reactor vessel lid 43 is removed from the reactor vessel main body 42 by the crane device.

On the other hand, in a case of mounting the reactor vessel lid 43 on the reactor vessel main body 42, the operation is the same as the above-described operation, but the rotation direction of the nut 66 is reversed in the bolt tensioner 102.

In this manner, in the fastening and loosening device of this example, the fastening and loosening device includes the transport devices 73a, 73b, 73c, and 73d capable of moving along the array direction of the plurality of stud bolts 65, the control panels 152a, 152b, 152c, and 152d that independently control the transport devices 73a, 73b, 73c, and 73d, the plurality of bolt tensioners 102a, 102b, 102c, and 102d, the control panels 153a, 153b, 153c, and 153d that independently control the bolt tensioners 102a, 102b, 102c, and 102d, and the transport operating device 77 including the control panel 151 that controls the control panels 152a, 152b, 152c, and 152d and the control panels 153a, 153b, 153c, and 153d, and the fault diagnosis device is provided by connecting the control panels 152a, 152b, 152c, and 152d to the transport operating device 77 through the power cables 81a, 81b, 81c, and 81d.

Therefore, the transport operating device 77 as the fault diagnosis device performs mutual fault diagnosis in the control panel 151, the control panels 152a, 152b, 152c, and 152d, the power cables 81a, 81b, 81c, and 81d, and the transport devices 73a, 73b, 73c, and 73d, and thus it is possible to allow the reliability of the device to be improved.

Further, in the fastening and loosening device of this example, the transport operating device 77 diagnoses faults of the control panel 151, the control panels 152a, 152b, 152c, and 152d, and the power cables 81a, 81b, 81c, and 81d by transmitting a fault diagnosis signal from the control panel 151 to the control panels 152a, 152b, 152c, and 152d by the power cables 81a, 81b, 81c, and 81d and also returning the fault diagnosis signal from the control panels 152a, 152b, 152c, and 152d to the control panel 151. Therefore, when the fault diagnosis signal flows through the control panel 151, the control panels 152a, 152b, 152c, and 152d, and the power cables 81a, 81b, 81c, and 81d, a fault of the control panel 151 or the control panels 152a, 152b, 152c, and 152d, or disconnection of the power cables 81a, 81b, 81c, and 81d can be easily diagnosed by the cutting position of the signal.

Further, in the fastening and loosening device of this example, the transport operating device 77 includes the switching device 154 capable of switching between the first control form to control the transport devices 73a, 73b, 73c, and 73d through the control panel 151 and the second control form in which the control panels 152a, 152b, 152c, and 152d are broken away from the transport operating device 77 and controls the transport devices 73a, 73b, 73c, and 73d. Therefore, during the normal time of the transport operating device 77 (the control panel 151), the switching device 154 performs switching to the first control form, whereby the control panel 151 controls the respective control panels 152a, 152b, 152c, and 152d, and on the other hand, at the time of a fault of the transport operating device 77 (the control panel 151), the switching device 154 performs switching to the second control form, whereby one of the control panels 152a, 152b, 152c, and 152d controls the other of the control panels 152a, 152b, 152c, and 152d, and thus it becomes possible to continue control.

Further, in the fastening and loosening device of this example, the transport operating device 77 (the control panel 151), the power supply section 79, the control panels 152a, 152b, 152c, and 152d, and the transport devices 73a, 73b, 73c, and 73d are made to be permanently installed at the reactor vessel lid 43, and the control panels 153a, 153b, 153c, and 153d and the fastening and loosening devices 76 (the bolt tensioners 102) are made to be able to be mounted or dismounted to the reactor vessel lid 43. Therefore, the transport operating device 77 performs an operation to the control panel 151), the power supply section 79, the control panels 152a, 152b, 152c, and 152d, and the transport devices 73a, 73b, 73c, and 73d which are permanently installed, whereby high reliability can be secured.

In addition, in the example described above, the fastening and loosening device according to the invention has been described applied to the reactor vessel 41. However, as the member to be fastened, there is no limitation thereto, and provided that a plurality of stud bolts and nuts are arranged along a predetermined direction, the invention can be applied to any thing.

The invention claimed is:

1. A fastening and loosening device that performs fastening or loosening by screwing and arranging a plurality of stud bolts to an object to be fastened, screwing a nut onto each of the plurality of stud bolts, and rotating the nut while applying tension to the stud bolt in an axial direction away from the object to be fastened, the fastening and loosening device comprising:
   a plurality of transport devices movable along an array direction of the plurality of stud bolts;
   a plurality of first control devices that independently controls the plurality of transport devices;
   a plurality of bolt tensioners supported on the plurality of transport devices;
   a plurality of second control devices that independently controls the plurality of bolt tensioners;
   a main control device that controls the plurality of first control devices and the plurality of second control devices;
   a first network arranged in a first passage and connects the main control device and each of the first control device;
   a second network that includes the first network that connects the main control device and each of the first control device as well as another network that is arranged in a second passage which is different from the first passage and connects each of the first control device and each of the second control device;
   a fault diagnosis device that is provided in the main control device and is connected to the first network, and
   a switching device included in the main control device and configured to switch between a first control form to control the transport device through the first control device via the second network and a second control form to control the transport device via said another network when the first control device is broken away from the main control device.

2. The fastening and loosening device according to claim 1, wherein the fault diagnosis device diagnoses faults of the main control device and the plurality of first control devices by transmitting a fault diagnosis signal from the main control device to the plurality of first control devices through the first network and also returning the fault diagnosis signal from the plurality of first control devices to the main control device.

3. The fastening and loosening device according to claim 1, wherein the fault diagnosis device diagnoses a fault of the first network by transmitting a fault diagnosis signal from the main control device to the plurality of first control devices through the first network and also returning the fault diagnosis signal from the plurality of first control devices to the main control device.

4. The fastening and loosening device according to claim 1, wherein the main control device, the first control device, and the transport device are mounted on the object to be fastened, and connected by the first network permanently installed, the second control device and the bolt tensioner are detachably mounted on the object to be fastened, and the main control device, the second control device, and the bolt tensioner are connected by the second network that is detachable.

* * * * *